March 29, 1960     R. H. LEWIS ET AL     2,930,444
PROPYLENE TETRAMER IN GAS-LIQUID PARTITION CHROMATOGRAPHY
Filed Oct. 28, 1957
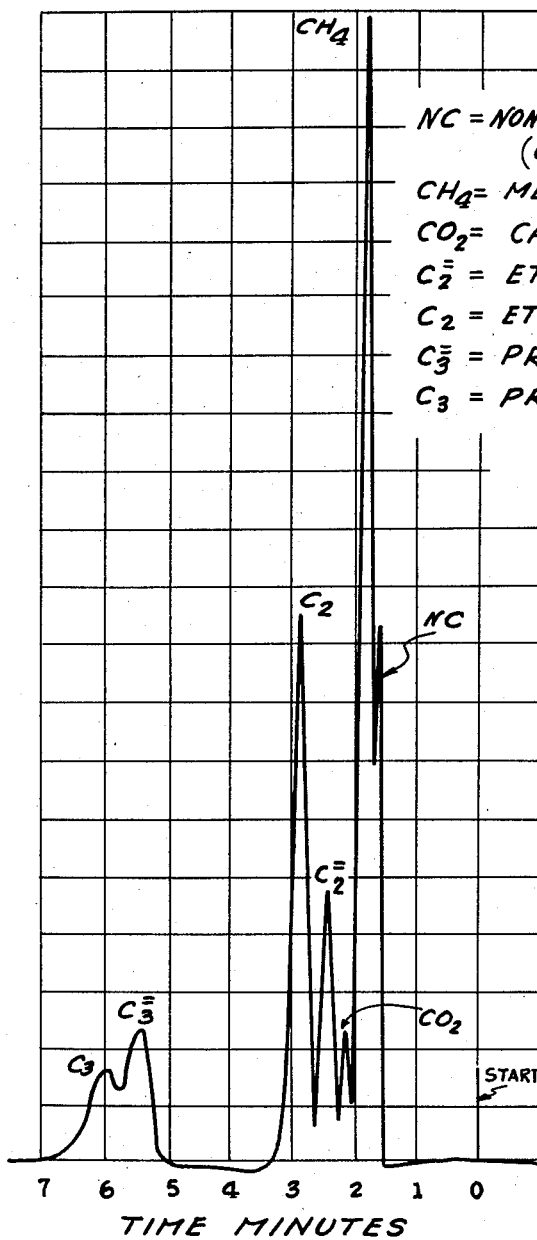
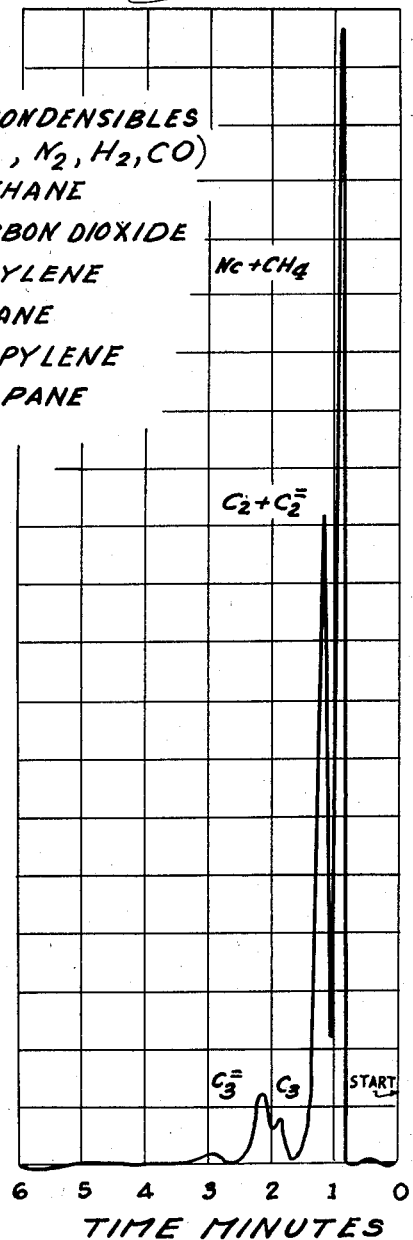
INVENTORS:
Russell H. Lewis
Thomas A. Hoffman
By Everett A. Johnson
Attorney

United States Patent Office 2,930,444
Patented Mar. 29, 1960

2,930,444

PROPYLENE TETRAMER IN GAS-LIQUID PARTITION CHROMATOGRAPHY

Russell H. Lewis and Thomas A. Hoffman, El Dorado, Ark., assignors to The American Oil Company, New York, N.Y., a corporation of Maryland Application October 28, 1957, Serial No. 692,723

6 Claims. (Cl. 183—2)

This invention relates to the analysis of fluids by means of a partitioning solvent. More particularly the invention relates to a stationary liquid phase for use in gas chromatography.

Many variable compounds have been tried heretofore as the liquid packing in gas-liquid partition chromatographic columns for the separation of non-condensibles ($N_2$, $H_2$, $O_2$ and CO) from hydrocarbon gases and $C_1$ to $C_3$ olefines and paraffines. However, all of the compounds tried fail to give the desired separation of hydrogen and other non-condensibles from hydrocarbons and paraffines from olefines.

A stationary phase to be useful in this type of system must be stable under the operating conditions of the column, must be selective in its retention of certain components, and must be capable of uniform distribution upon the finely divided solid support or screen and the like that may be used in supporting the stationary liquid phase. It is with respect to the stationary liquid phase that this invention relates.

It is, therefore, an important object of this invention to provide a stable liquid phase packing for use in the separation and analysis of complex mixtures of volatile materials. It is a further object of the invention to provide a gas-liquid partition column packed with a liquid phase supported on an inert material. It is also an object of the invention to provide a liquid phase which is sufficiently high boiling so as not to be eluted from the column. An additional object of the invention is to provide such a liquid phase having a viscosity which is low so that gases dissolved therein can be eluted from it easily to obtain sharp elution peaks with good symmetry. These and other objects of the invention will become apparent as the description thereof proceeds.

The invention may be more fully understood when considered in conjunction with the accompanying drawing in which:

Figure 1 illustrates a separation using a propylene tetramer column;

Fig. 2 illustrates a separation with another liquid phase of a different type relying upon hydrogen bonding.

Briefly, we have found that the use of a narrow boiling cut of propylene tetramer as the liquid phase packing will permit such separations. The use of our liquid phase permits, for example, the analysis of gaseous mixtures containing hydrogen and other condensibles, methane, ethane, ethylene, propane, propylene, and other light hydrocarbons. With the propylene tetramer cut, good separations have been obtained of the non-condensibles and each hydrocarbon component of such mixtures.

We prefer to use a narrow boiling, i.e. 480–490° F., bottom fraction comprising 2.5–5.0% of the full tetramer, as the liquid phase packing in the column. Such a propylene tetramer fraction has the advantage over other liquid phases of permitting complete analysis on a simple once-through basis with helium as the eluting gas.

In Table I below, we have described the physical properties of both the full propylene tetramer product mixture and the preferred bottom fraction.

*Table I*

| | Tetramer | Bottom fraction |
|---|---|---|
| API Gravity | 50.8 | 45.0 |
| IBP | 340 | 388 |
| 10 | 356 | 404 |
| 20 | 360 | 412 |
| 30 | 364 | 414 |
| 40 | 367 | 416 |
| 50 | 370 | 422 |
| 60 | 375 | 424 |
| 70 | 382 | 430 |
| 80 | 390 | 436 |
| 90 | 408 | 450 |
| 95 | 446 | 464 |
| EP | 500 | 488 |
| REC | 99 | 99 |
| RES | 1 | 1 |
| Loss | 0 | 0 |
| Wt. Percent S | .017 | .018 |
| Br No | 108 | 07.1 |
| Aniline Pt | 132.8 | 144.8 |
| RI @ 25° C | 1.4300 | 1.4458 |
| Molecular Wt | 160 | 169 |

Propylene tetramer is a special product obtained from a polymerization operation using phosphoric anhydride as a catalyst. Instead of recycling $C_3$ and $C_4$, as in polymer gasoline production, the polymer gasoline is recycled. The final product is a mixture of unsaturated compounds in the $C_{12}$ range.

Propylene tetramer so produced was fractionated into 10% fractions with a column of about 15 theoretical plates. The separate fractions were evaluated as the liquid phase in gas-liquid partition chromatography. The solid phase was celite 545 and fire brick C-22. It was observed that the bottom fraction of the product mixture gave the best resolution on analyzing light hydrocarbons. A further fractionation of the 10% bottom fraction showed that the bottoms portion comprising 2.5–5% of the product mixture gives better resolution and is preferred for separating non-condensibles ($N_2$—$O_2$—$H_2$—CO), methane, ethane, ethylene, propane, and propylene.

A comparison of the effectiveness of the narrow cut of propylene tetramer as a liquid phase with another liquid phase of a different type relying upon hydrogen bonding for its effectiveness is set out in the drawings. It will be noted that the use of the propylene tetramer liquid phase permitted separations not possible with the control liquid phase.

In each case the same feed was supplied to a column comprising 16 feet of 4 mm. glass tubing packed with crushed firebrick each having one of the two liquid phases thereon. The carrier gas was helium supplied at a flow rate of 40 ml. per minute. The detector was a thermal conductivity cell which is commercially available and the cell current was 100 ma. In the case of the tetramer column, the sample comprised 0.7 ml. and in Figure 2, the sample amounted to 0.5 ml. The retention times are shown in Table II.

*Table II*

| Component | Retention Time (Minutes) | |
|---|---|---|
| | Propylene Tetramer | Reference Liquid Phase |
| Non-Condensibles | 1.5 | 1.0 |
| Methane | 1.8 | |
| Carbon Dioxide | 2.1 | |
| Ethane | 2.9 | 1.25 |
| Ethylene | 2.5 | |
| Propane | 6.0 | 1.9 |
| Propylene | 5.5 | 2.1 |

These data make it apparent that the propylene tetramer cut is far superior to the highly regarded liquid phase used as a reference.

From the above it will be apparent that we have attained the objects of our invention and have provided a stationary liquid phase packing for a gas chromatographic column wherein the difficulties of the prior art are avoided and excellent separations of the hydrogen and non-condensibles, $CO_2$ and $C_1$ to $C_3$ hydrocarbons can be obtained with our stationary liquid phase.

The invention has been described with reference to preferred embodiments but it is to be understood that these are by way of illustration only. Accordingly, it is contemplated that modifications and variations can be made in the operating techniques without departing from the spirit of the invention.

What we claim is:

1. An apparatus for conducting gas chromatographic separations of gaseous hydrocarbons selected from the group consisting of $C_1$ to $C_3$ olefins and $C_1$ to $C_3$ paraffins which includes an elongated column, an inlet to and an outlet from said column, an inert packing within said column, means for introducing into said column a mixture of such gaseous hydrocarbons to be separated, and a stationary liquid phase on said packing, said liquid phase consisting essentially of a propylene tetramer fraction boiling between about 480° F. and 490° F.

2. The improved apparatus for separating complex hydrocarbon mixtures of gaseous hydrocarbons selected from the group consisting of methane, ethane, ethylene, propane and propylene by gas chromatography which includes an elongated column, an inlet to and an outlet from said column, an inert ceramic packing in said column, means for introducing into said column a mixture of such gaseous hydrocarbons to be separated, and a stationary liquid phase supported by said packing in said column, said stationary liquid phase consisting essentially of a propylene tetramer.

3. The apparatus of claim 2 wherein the liquid phase comprises a propylene tetramer fraction boiling between about 480° and 490° F.

4. In the analysis of difficultly separated mixtures, the method which comprises passing a gas mixture selected from the group consisting of hydrogen, nitrogen, oxygen, carbon oxides, methane, ethane, ethylene, propane and propylene through an extended mass of divided inert supporting material having thereon a stationary liquid phase consisting essentially of propylene tetramer.

5. An improved method for separating difficultly separated complex mixtures containing non-condensibles selected from the group consisting of hydrogen, nitrogen, oxygen and carbon oxides and light hydrocarbons selected from the group consisting of methane, ethane, ethylene, propane and propylene which comprises the steps of passing such mixtures combined with a carrier gas in contact with a stationary liquid phase consisting essentially of a propylene tetramer cut.

6. The method of separating and identifying components of a gaseous complex hydrocarbon mixture selected from the group consisting of $C_1$ to $C_3$ olefins and $C_1$ to $C_3$ paraffins which comprises the steps of introducing such complex mixture into a stream of carrier gas, flowing the combined stream into a partition zone over an extended film of a stationary liquid phase consisting essentially of a propylene tetramer cut, whereby individual components of said mixture are retained by said film for different periods of time so that the components are eluted successively from the liquid phase and discharged from the partition zone.

References Cited in the file of this patent

"Gas-Liquid Partition Chromatography," by D. H. Lichtenfels et al., Analytical Chemistry, volume 27, No. 10, October 1955, pages 1510 to 1513.